(12) United States Patent
Murakami

(10) Patent No.: US 7,379,108 B2
(45) Date of Patent: May 27, 2008

(54) IMAGE SENSOR, DRIVING METHOD AND CAMERA

(75) Inventor: Masashi Murakami, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 834 days.

(21) Appl. No.: 10/802,939

(22) Filed: Mar. 18, 2004

(65) Prior Publication Data

US 2004/0207741 A1 Oct. 21, 2004

(30) Foreign Application Priority Data

Mar. 19, 2003 (JP) .............................. 2003-075769

(51) Int. Cl.
*H04N 3/14* (2006.01)
*H04N 5/335* (2006.01)

(52) U.S. Cl. ..................................... 348/302
(58) Field of Classification Search ................. 348/302
See application file for complete search history.

(56) References Cited

U.S. PATENT DOCUMENTS 5,973,311 A * 10/1999 Sauer et al. ............. 250/208.1

6,606,122 B1 * 8/2003 Shaw et al. ................... 348/302
2003/0137594 A1 * 7/2003 Koizumi et al. .............. 348/308
2007/0115379 A1 * 5/2007 Endo et al. ................... 348/308

FOREIGN PATENT DOCUMENTS

| JP | 64-44178 | 2/1989 |
| JP | 6-104292 | 4/1994 |

* cited by examiner

*Primary Examiner*—James M. Hannett
(74) *Attorney, Agent, or Firm*—Wenderoth, Lind & Ponack, L.L.P.

(57) ABSTRACT

The image sensor according to the present invention comprises a shift register which includes a plurality of stages of unit registers Res, a plurality of transistors Tr3, and a plurality of transistors Tr8; each transistor Tr3 corresponds to one of the unit registers Res, and resets an input signal In of a back unit register when the corresponding unit register Res to the Tr3 outputs a high level signal, the back unit register being arranged in back of the corresponding unit register Res in shifting direction; and each transistor Tr8 corresponds to one of the unit registers, and resets an input signal of the front unit register when the corresponding unit register to the Tr8 outputs a high level signal, the front unit register being arranged in front of the corresponding unit register in shifting direction.

10 Claims, 14 Drawing Sheets

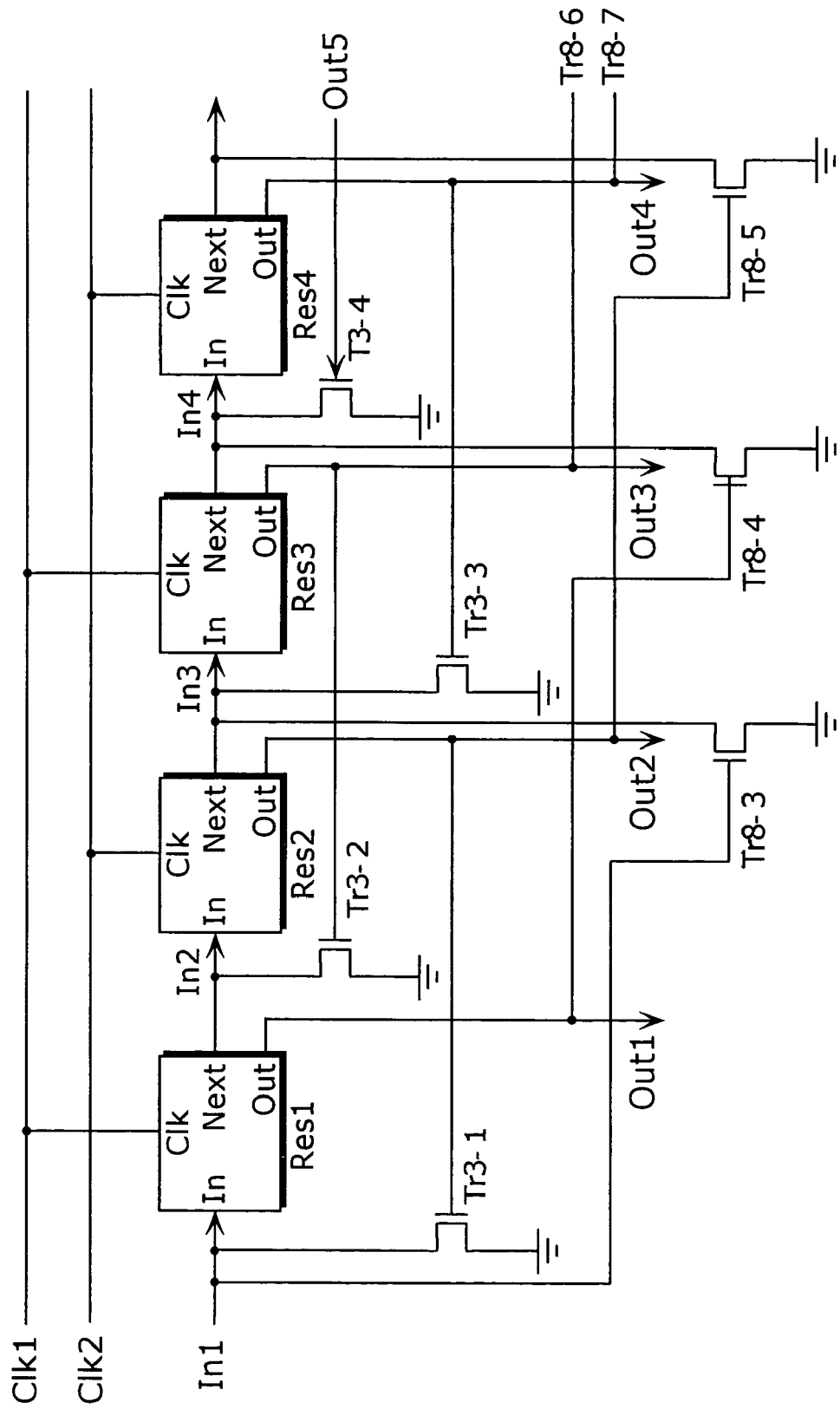

IMAGE SENSOR, DRIVING METHOD AND CAMERA

BACKGROUND OF THE INVENTION (1) Field of the Invention

The present invention relates to a MOS image sensor comprising a dynamic shift register, in particular, to the improvement of the reset function.

(2) Description of the Related Art

Recently, an image sensor using an amplifier MOS sensor has been brought to attention. This image sensor characterized by its high sensitivity amplifies a signal detected by a photodiode for each cell indicating a pixel, using a transistor.

A dynamic shift register is used as a circuit to scan horizontally or vertically a sensor unit which has pixels arranged two-dimensionally in such image sensor as described above so as to enhance simplification, high integration and low power consumption of the circuit.

FIG. 1 is a block diagram showing a structure of the conventional image sensor. This image sensor is made up of an imaging unit 61, shift registers 62 and 63, a signal processing unit 64, and a preamp 65. The imaging unit 61 contains pixels which are arranged two-dimensionally. The shift register 62 outputs a row selection signal to select one of the rows from the imaging unit 61. The shift register 63 outputs a pixel selection signal to select a pixel in the selected row. The signal processing unit 64 derives a pixel signal from the selected pixel. The preamp 65 amplifies the derived pixel signal.

FIG. 2 is a block diagram showing a structure of the conventional NMOS dynamic-typed shift register and is utilized as the shift registers 62 and 63. The diagram only shows 4 stages; however, in actuality, there are from hundreds to thousands stages.

The clock signals Clk1 and Clk2 are two-phase clock signals, on which shifting operation bases. The clock signal Clk1 is inputted into the "2N+1"th(where N is an integer) units, and the clock signal Clk2 is inputted into the "2N"th register units. Thus, the "2N+1"th register units and the "2N"th register units operate in alternate shifts.

In FIG. 2 Res1, Res2 . . . (in a case of mentioning anyone, the abbreviation Res is used) are unit registers. These unit registers memorize a logical value of an input signal In inside in synchronization with a clock signal Clk. Then, each of the unit registers outputs the memorized logical value as the output signals, Out and Next. The output signal Out is outputted as a row selection signal or a column selection signal to the imaging unit 61.

Transistors Tr3-1,3-2, . . . (in a case of mentioning anyone, the abbreviation Tr3 is used) are reset transistors, each resetting an input signal In that is inputted to each of the unit registers. Here, the reset of the input signals means changing the level of the input signals to low level, and thus, discharges the capacity which is connected to the corresponding input signal line (e.g. the gate capacity of the transistor). In other words, each of the transistors Tr3 resets the input signal In by the following two steps. First, the Tr3 changes the level of the input signal In to low level when the output signal Out of the unit register is at high level, said unit register being next to the unit register containing the input signal In that is connected to the current transistor. Then, the Tr3 discharges the charge stored in the memory elements within both the current and the front unit registers. This is to prevent the unit register from keeping the charge forever and remaining at high-level without resetting. After resetting, the level of the input signal In falls to low-level or the state of the input signal In changes to high impedance.

Transistors Tr7-1, 7-2 . . . (in a case of mentioning anyone, the abbreviation Tr7 is used) are on when the reset control signal RS rises to high level, and reset all of the input signals of all the unit registers at once. The reset control signal RS inputs the input signal In1 of the unit register Res1 as a reset pulse right before the start pulse, in synchronization with the start pulse. Thus, all the unit registers get reset (all clear) before the start pulse is applied.

FIG. 3A is a circuit diagram showing a structure of the unit register Res. As the diagram shows, the unit register is made up of NMOS transistors Tr1, Tr2, and a capacitor C1. FIG. 3B shows an operation performed by the unit register in a case the input signal In is at high level. Because the input signal In is at high level, a gate electrode of the transistor Tr1 is already at high level due to a gate capacitor of the transistor Tr1 and a potential of the capacitor C1, before the rising edge of the clock signal Clk(in FIG. 3). In this state, when the clock signal Clk rises from low level to high level, a gate voltage In of the transistor Tr1 is boosted via the capacitor C1(in FIG. 3). Also, the potential under the gate becomes higher than the high level of the clock signal Clk since a voltage higher than the clock signal is applied to the gate of the transistor Tr1, and thereby, the Out signal is outputted at the level as high as that of the clock signal Clk(in FIG. 3). When the clock signal Clk falls to low level, the Out signal is outputted at the level as low as that of the clock signal Clk. Here, the Next signal is outputted at high level even after the fall of the clock signal Clk since the high level is held in the gate capacitor of the unidirectional transistor Tr2.

In the case the input signal In is at low level (or floating), the boost transistor Tr1 is not on, therefore, both of the Out signal and the Next signal are held at low level(or floating) even if the clock signal Clk is inputted.

FIG. 4 is a time chart showing a reset operation of the transistor Tr3 shown in FIG. 2. As shown in FIG. 4, the clock signals Clk1, Clk2, the input signals (or the internal data) In1~In4, the output signals Out1~Out4 are the signals shown in FIG. 2 and FIG. 3.

First, the unit register Res1 synchronizes with the Clk1 signal (in FIG. 4), and boosts the input signal In1 which is at high level to hold it inside (in FIG. 4). At the same time the unit register Res1 outputs the output signal Out1 as the pixel selection signal (in FIG. 4), and raises the level of the Next1 signal to high level. The Next 1 that has been boosted to high level is inputted as the input signal In2 into the next unit register Res2. Here, each of the other "2N+1"th unit registers where the Clk1 signal has been inputted is in the state of low level (or in the state of high impedance), and does not take in a high level signal.

In this manner, each of the "2N+1"th unit registers to which the clock signal Clk1 is provided performs a shifting operation. The next clock signal Clk2 performs a shifting operation of each of the "2N"th unit registers.

Also, when the output signal Out2 rises to high level, the reset transistor Tr3-1 is on. This Tr3-1 changes the level of the input signal In1 to low level. Then, the gate electrode of the transistor Tr1 and the charge of the capacitor C1 are discharged, which resets the input signal In1 in the unit register Res1.

When the output signal Out3 rises to high level, the reset transistor Tr3-2 is on. This causes the gate electrode of the transistor Tr1 and the capacitor C1 within the unit register Res2 to discharge. At the same time, the charge of the gate electrode of the unidirectional transistor Tr2 within the unit register Res1 is discharged via the Next1 signal line. In this respect the input signal In 2 is reset in the unit register Res2.

As mentioned above, in the NMOS dynamic shift register, the unit register which outputs the high level signal resets the input signal In which is inputted to the unit register of the front stage.

Such shift register is introduced in the Japanese Laid-Open Patent publication No. S64-44178 which discloses the advanced technology mentioned above. The Japanese Laid-Open Patent publication No. S64-44178 discloses the bidirectional shift register which can choose a shifting direction with two types of groups of transistors. One group of transistors connect the unit registers in the forward direction, and the other group of transistors connect them in the reverse direction.

FIG. 5 is a block diagram showing a structure of the conventional bidirectional shift register. There are two differences between FIG. 5 and FIG. 1. One is that the extra transistors are added: the transistors Tr4-1, Tr4-2, . . . (abbreviated as Tr4 in a case of mentioning anyone), the transistors Tr5-1. Tr5-2, . . . (Tr5), the transistors Tr8-1, Tr8-2, . . . (Tr8), the transistors Tr9-1, Tr9-2, . . . (Tr9), and the transistors Tr10-1, Tr10-2, . . . (Tr10). The other difference is that the control signals Norm and Rev are specified. These different features will be mainly explained in the following.

The control signals Norm, Rev are the signals which designate a shifting direction. In the case of (Norm, Rev)= (High Level, Low Level), they designate the forward shifting operation. In the case of (Norm, Rev)=(Low Level, High Level), they designate the backward shifting operation.

The transistor Tr4 is on when the control signal Norm is at high level, and connects the input and output of the unit register in the forward direction. Also, the transistor Tr10 is on when the control signal Norm is at high level, and transmits the output of the unit register to the reset transistor Tr3.

The transistor Tr5 is on when the control signal Rev is at high level, and connects the input and output of the unit register in the backward direction. Also, the transistor Tr9 is on when the control signal Rev is at high level, and transmits the output of the unit register to the reset transistor tr8.

In the forward shifting operation, the transistors Tr4 and Tr10 are on, and Tr5 and Tr9 are off. In this state, the unit register which outputs the high-level output signals turns on the transistor Tr3 which is connected to the input signal in the previous (the backward in the shifting direction) unit register through the transistor Tr10. In this manner, the input signal of the previous unit register is reset.

In the backward shifting operation, the transistors Tr5 and Tr9 are on, and the Tr4 and Tr10 are off. In this state, the unit register which outputs the high-level output signal turns on the transistor Tr8 which is connected to the input signal of the previous (the backward of the shifting direction) unit register through the transistor Tr9. In this manner, the input signal of the previous unit register is reset.

The transistor Tr7 is the transistor for the all-clear purpose as shown in FIG. 2, and is turned on by the reset control signal RS right before the start pulse in synchronization with the start pulse. In addition, the Japanese Laid-Open Patent publication No. H 6-104292 discloses the shift register which initiates the start at some midpoint of the shift register in order to deal with a zoom mode and the like. For example, this shift register enables scanning from the one-fourth point to the three-fourths point in the shift register.

SUMMARY OF THE INVENTION

An object of the present invention, in view of the above problem, is to provide the image sensor, the method of the image sensor, and the camera, said image sensor comprising the shift register that is capable of applying the next start pulse in the middle of the shifting operation in the simplified circuit structure.

The image sensor according to the present invention in order to achieve the above object comprises: a shift register, formed by a dynamic logic circuit, for sequentially selecting a row or a column of the two-dimensional imaging unit, wherein the shift register includes a plurality of stages of unit registers, each holding a signal, a plurality of first reset circuits and a plurality of second reset circuits. The first reset circuits correspond to the unit registers, and each of the first reset circuits resets an input signal of a back unit register when the unit register corresponding to the first reset circuit outputs a high level signal, said back unit register being arranged in back of the corresponding unit register in shifting direction. The second reset circuits correspond to the unit registers, and each of the second reset circuits resets an input signal of a front unit register when the unit register corresponding to the second reset circuit outputs a high level signal, said front unit register being arranged in front of the corresponding unit register in shifting direction.

According to this structure, each of the second reset circuits resets an input signal of a front unit register when the unit register corresponding to the second reset circuit outputs a high level signal, thereby the special scanning is made possible, wherein two pulses are scanned with arbitrary space, and for example, can be utilized for an electronic shutter.

Here, the following structure is possible: the first reset circuit has a first transistor which is on when the output signal of the corresponding unit register is at high level, and drives an input signal line of the back unit register to low level via the first transistor; and the second reset circuit includes a second transistor which is on when an output signal of the corresponding unit register is at high level, and drives an input signal line of the front unit register to low level via the second transistor.

According to this structure, a simple circuit structure is made possible because each of the first and second reset circuits is made up of only one transistor.

In addition, the following structure is possible: the front unit register is one of the unit resisters which are arranged at least two stages forward from the unit register, corresponding to each of the second reset circuits, in shifting direction. According to this structure, the front unit register can be one of the unit registers which are arranged, for example, the third, the tenth, and the twentieth stage forward in the shifting direction.

Furthermore, the image sensor of the present invention comprises a bidirectional shift register, formed by a dynamic logic circuit, for sequentially selecting a row or a column of the two-dimensional image sensor, wherein the bidirectional shift register includes a plurality of stages of unit registers, each holding a signal, a plurality of first reset circuits and a plurality of second reset circuits. The first reset circuits correspond to the unit registers, and each of the first reset circuits i) resets an input signal of a back-forward unit register when the unit register corresponding to the first reset circuit outputs a high level signal in a forward shifting operation, said back-forward unit register being arranged in back of the corresponding unit register in forward shifting direction, and ii) resets an input signal of a front-backward unit register when the unit register corresponding to the first reset circuit outputs a high level signal in a backward shifting operation, said front-backward unit register being arranged in front of the corresponding unit register in backward shifting direction. The second reset circuits correspond to the unit registers, and each second reset circuit i) resets an input signal of a front-forward unit register when the unit register corresponding to the second reset circuit outputs a high level signal in a forward shifting operation, said front-forward unit register being arranged in front of the corresponding unit register in forward shifting direction; and ii) resets an input signal of a back-backward unit register when the corresponding unit register outputs a high level signal in a backward shifting operation, said back-backward unit register being arranged in back of the corresponding unit register in backward shifting direction.

According to this structure, each second reset circuit resets the input signal of the front-forward unit register in the forward shifting operation; each first reset circuit resets the input signal of the front-backward unit register in the backward shifting operation. Thus, in both of the forward shifting operation and the backward shifting operation, the second start pulse can be applied at any timing in the middle of the shifting operation. As a result, in both of the forward shifting operation and the backward shifting operation, the special scanning is made possible, wherein two pulses are scanned with arbitrary space, and for example, can be utilized for an electronic shutter.

Here, the following structure is possible: the bidirectional shift register includes a plurality of forward connecting transistors, each connecting input and output of said plurality of stages of the unit registers in forward direction in a forward shifting operation and a plurality of backward connecting transistors, each connecting input and output of the unit registers in backward direction in a backward shifting operation. Each first reset circuit i) has a first transistor which is on when an output signal of the corresponding unit register is at high level, said first transistor being connected to the ground line, ii) connects, via the forward connecting transistor, the input signal line of a back-forward unit register and the first transistor, and iii) connects, via the backward connecting transistor, the input signal line of the front-backward unit register and the first transistor. Each second circuit i) has a second transistor which is on when an output signal of the corresponding unit register is at high level, said second transistor being connected to the ground line, ii) connects, via the forward connecting transistor, the input signal line of the front-forward unit register and the second transistor, and iii) connects, via the backward connecting transistor, the input signal line of the back-backward unit register and the second transistor.

Each of the first transistor and the second transistor functions as both of the reset transistor in the forward shifting operation and the reset transistor in the backward shifting operation, which enables a small-scale circuit, thereby a vertically reversed image is acquired either by a regular camera or an electronic shutter function.

In addition, the following structure is possible: the front-forward unit register is any one of the unit registers which are arranged at least two stages forward in shifting direction from the unit register corresponding to each second reset circuit, and the front-backward unit register is any one of the unit registers which are arranged at least more than two stages forward in shifting direction from the unit register corresponding to the first reset circuit.

Furthermore, the following structure is made possible: the front-forward unit register and the front-backward unit register are any one of the unit registers which are arranged at least two stages forward from the unit register corresponding to each second reset circuit in the shifting direction. According to this structure, the front-forward unit register and the front-backward unit register can be any unit register which is arranged, for example, the third, the tenth, the twentieth stage forward in the shifting direction.

Moreover, the driving method of the image sensor of the present invention and the camera have the similar structure, function, and effects to the ones mentioned above.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a block diagram showing the structure of the shift register according to the first embodiment;

DESCRIPTION OF THE PREFERRED EMBODIMENT(S)

First Embodiment

Figure 1:
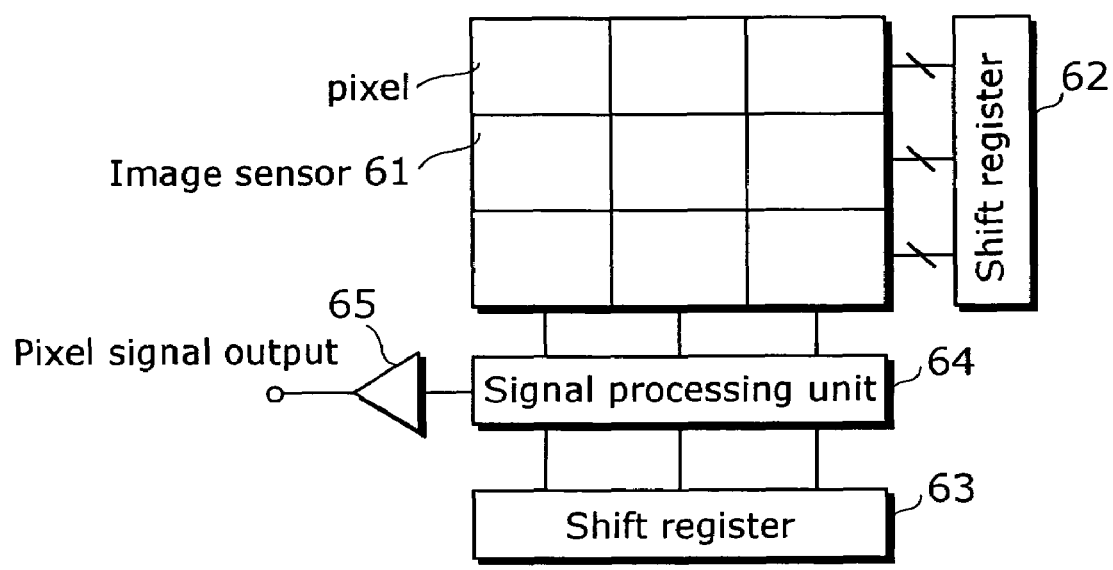
FIG. 1 is a block diagram showing a sketchy structure of the conventional image sensor.
Figure 2:
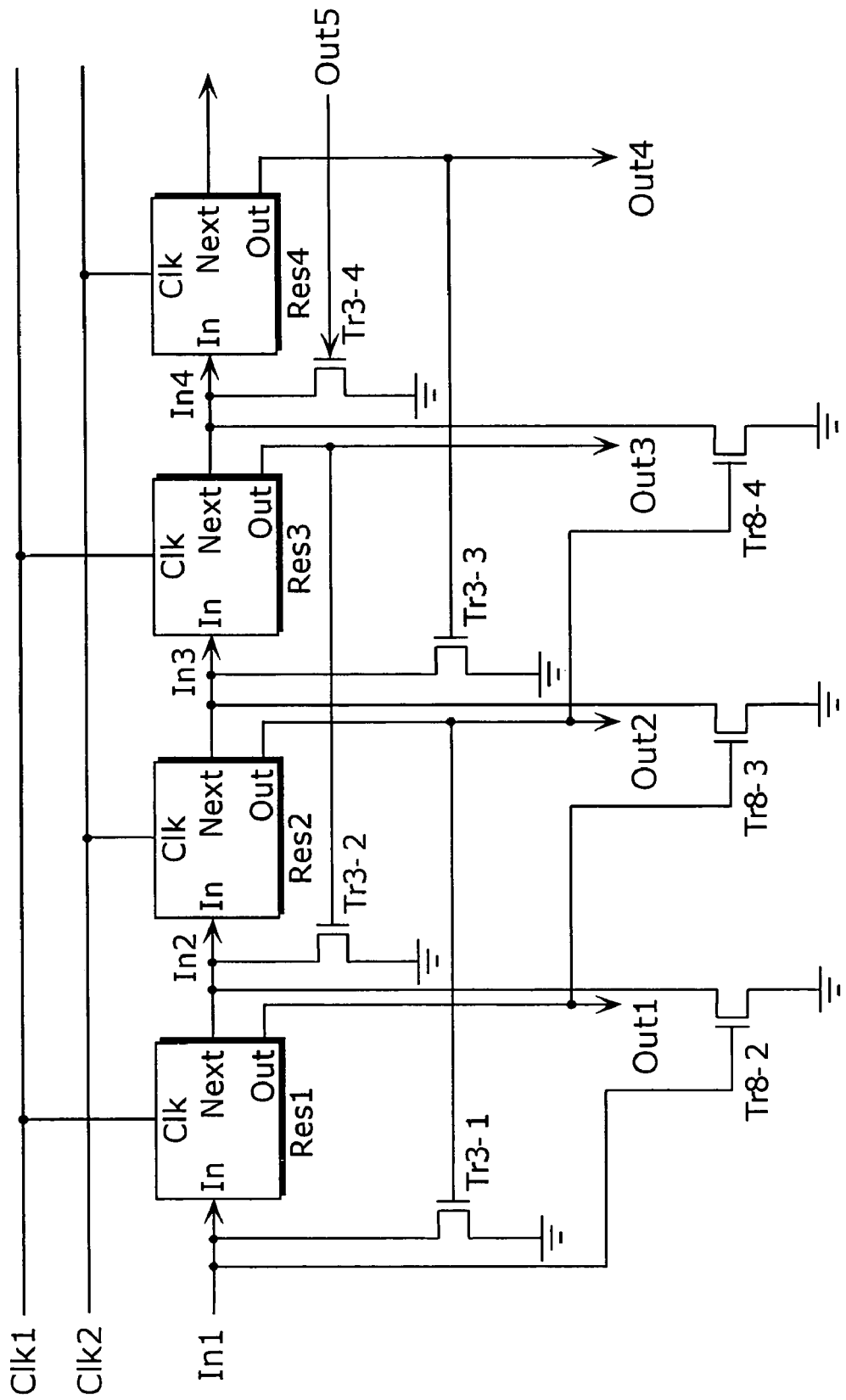
FIG. 2 is a block diagram showing the structure of the conventional NMOS dynamic shift register.

FIG. 6 is a block diagram showing the structure of the shift register according to the first embodiment of the present invention. This shift register is equipped with either or both of the shift register 62 which outputs a row selection signal and the shift register 63 which outputs a pixel selection signal in the image sensor as shown in FIG. 1. Although FIG. 6 shows only four stages for the sake of convenience, in actuality, there are from hundreds to thousands of stages according to the number of pixels.

As FIG. 6 shows, the shift register is equipped with the unit registers Res1, Res2 . . . (abbreviated as Res in the case of mentioning anyone), the transistors Tr3-1, Tr3-2 . . . (abbreviated as Tr3 in the case of mentioning anyone) and the transistors Tr8-3, Tr8-4 . . . (abbreviated as Tr8 in the case of mentioning anyone): the shift register resets the input signal of the forward unit register, in addition to the backward unit register in the shifting direction.

The unit register Res memorizes the logical value of the input signal In inside in synchronization with the clock signal Clk, and outputs the memorized logical value as the output signals Out and Next. Here, the logical value is either at high level or in the state of floating; otherwise, it is either at high level or at low level. However, the voltage of the input signal In is boosted inside the unit register, and temporarily becomes a high voltage which is higher than high level. The structure of each individual unit register Res is the same as the one shown in FIG. 3A, and the operational timings inside are the same as the ones shown in FIG. 3B. Thus, the explanation will be omitted.

The transistor Tr3 is a reset transistor to discharge the charge which is accumulated in the memory device of the unit register by lowering the level of the current input signal In to low level when the output signal Out of the next unit register to the unit register where the current transistor Tr3 is connected to the input signal In is at high level. This is to prevent the charge from remaining inside the unit register and keeping outputting high level signals. After resetting the level of the output signals Out and Next falls to low level or the state of the output signals Out and Next changes to high impedance.

The transistor Tr8 is a reset transistor to discharge the accumulated charge in the memory device of the unit register by changing the level of the current input signal to low level when the output signal Out of the unit register which is two stages forward from the unit register where the current transistor Tr8 is connected to the input signal In is at high level. As a result, when the output signal is at high level, each unit register resets the input signal In of the unit register which is three stages forward.

Figure 7A:
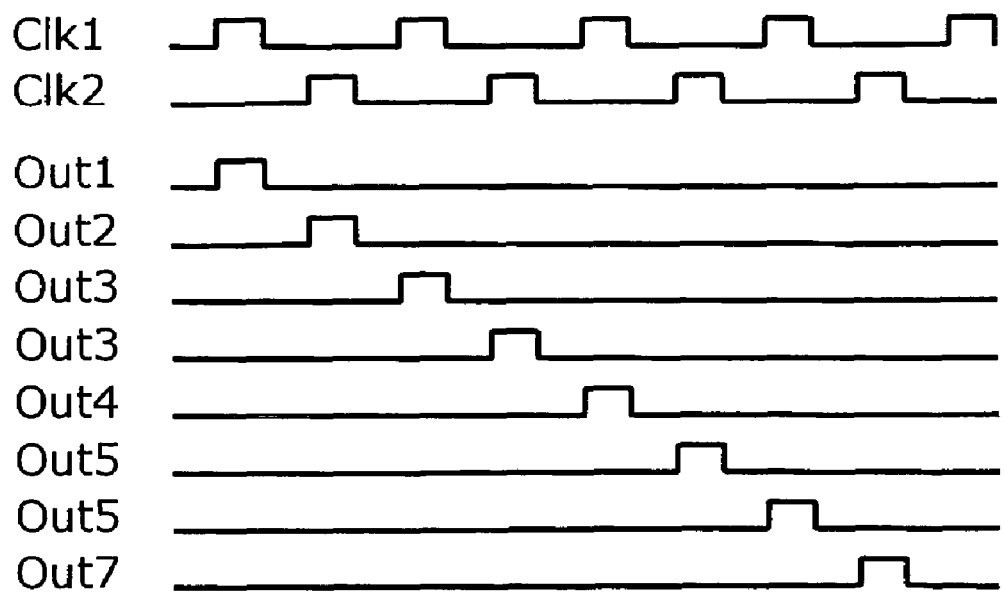
FIG. 7A is a time chart showing operational timings in the regular scanning mode where only one unit register outputs the output signal.

FIG. 7A is a time chart showing operational timings in the regular scanning mode where only one unit register outputs the output signal in the shift register as shown in FIG. 6. In FIG. 7A the clock signals Clk1, Clk2 and the output signal Out are the same signals as shown in FIG. 6. The output signal Out is sequentially shifted in synchronization with the clock signals Clk1 and Clk2. As FIG. 7A shows, in the regular scanning mode as a result of only one start pulse being applied, only one of the output signals Out in the shift register outputs the pulse.

Figure 7B:
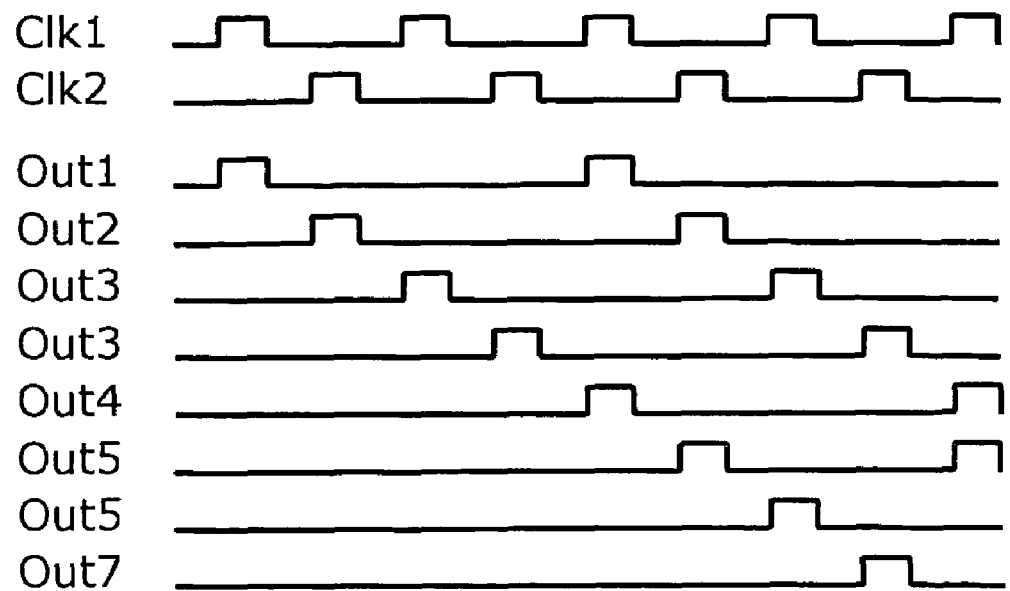
FIG. 7B is a time chart showing operational timings in the special scanning mode where two unit registers output the output signals.

FIG. 7B is a time chart showing operational timings in the special scanning mode where two unit registers output the output signals in the shift register as shown in FIG. 6. FIG. 7B shows the state in the case two start pulses are applied with the space of four clocks. As a result, two pulses are outputted to each of the output signals Out with the same space as the start pulses.

For example, in the case this shift register is the shift register 62 as shown in FIG. 1, it can be utilized as an electronic shutter with the first pulse as the pulse to reset a row of the image pickup device and the second pulse as the pulse to read the pixel value of the current row.

As mentioned above, the shift register according to the first embodiment is equipped with the transistor Tr3 to reset the input signal of the unit register which is in back of the current unit register in the shifting direction when the unit register Res outputs a high level signal, and with the transistor Tr8 to reset the input signal of the unit register which is in front of the current unit register in the shifting direction when the unit register Res outputs a high level signal. Thus, this shift register resets (clears) the input signal of the forward unit register, which enables the application of the second start pulse at anytime in the middle of the shifting operation. As a result, the special scanning with which two pulses are scanned with any intervals is made possible; for example, it can be utilized for an electronic shutter.

Second Embodiment

Figure 8:
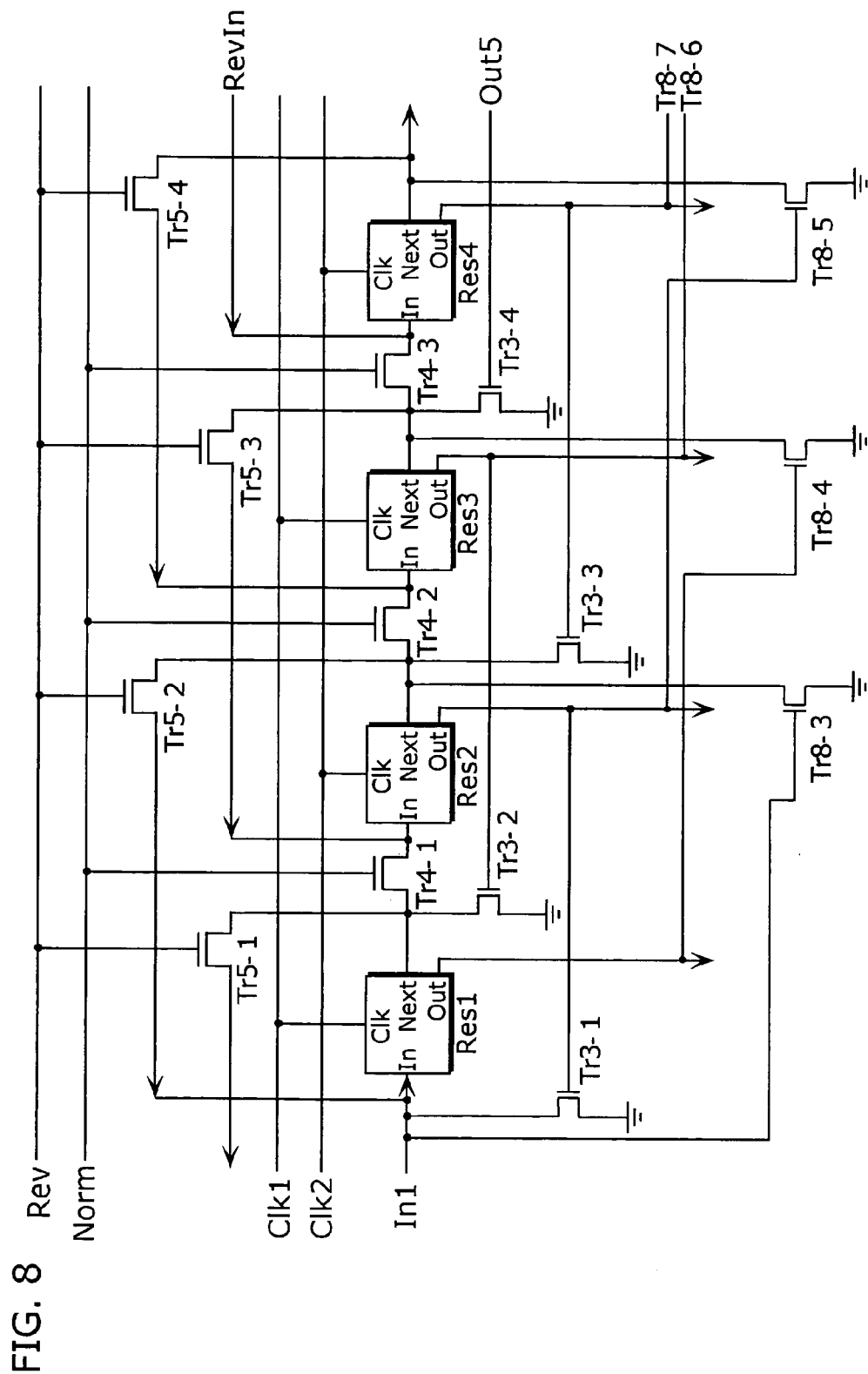
FIG. 8 shows the structure of the bidirectional shift register according to the second embodiment.

FIG. 8 shows the structure of the bidirectional shift register according to the second embodiment. In FIG. 8 the bidirectional shift register is equipped with the unit registers Res1, Res2, . . . (abbreviated as Res in the case of mentioning anyone), the transistors Tr4-1, Tr4-2, . . . (Tr4), the transistors Tr5-1, Tr5-2, . . . (Tr5), transistors Tr3-1, Tr3-2, . . . (Tr3) and the transistors Tr8-1, Tr8-2, . . . (Tr8). Also, the control signals Norm, Rev are the signals which designate a shifting direction. In the case of (Norm, Rev)= (High Level, Low Level), they designate the forward shifting operation. In the case of (Norm, Rev)=(Low Level, High Level), they designate the reverse shifting operation.

The transistor Tr4 is on when the control signal Norm is at high level, and connects the input and output of the unit register in the forward direction.

The transistor Tr5 is on when the control signal Rev is at high level, and connects the input and output of the unit register in the reverse direction.

The transistors Tr3 and Tr8 are provided to reset both the input signal of the unit register which is in back of the shifting direction and the input signal of the unit register which is front of the shifting direction from the viewpoint of the unit register where the output signal is at high level in the case of both the forward shifting direction and the backward shifting direction. The resetting operation of the input signal of the unit register will be explained for each of the cases below: (A) in front of the forward shifting direction, (B) in back of the forward shifting direction, (C) in front of the backward shifting direction and (D) in back of the backward shifting direction.

Figure 9:
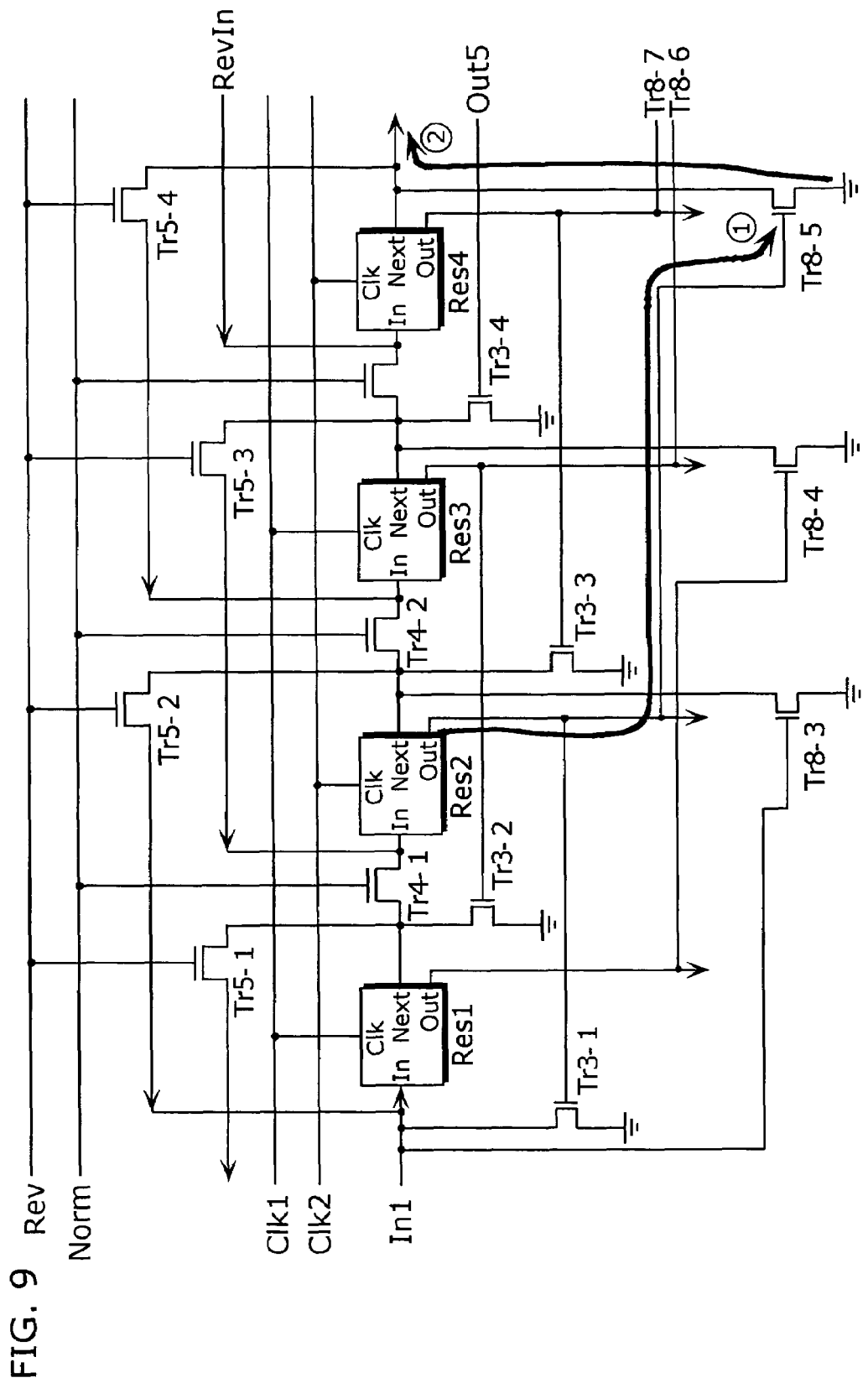
FIG. 9 shows the resetting operation of the backward unit register in the case of the forward shifting direction.

(A) Each of the transistors Tr8 resets the input signal In of the unit register (the front unit register of the forward direction) which is placed in front of the unit register where the output signal Out which is connected to the gate is at high level in the forward shifting operation. FIG. 9 shows the resetting operation of the front unit register of the forward direction in the case the output signal of the unit register Res2 is at high level. As in FIG. 9, the transistor Tr8-5 is on when the output signal Out2 of the unit register Res2 is at high level (shown in the diagram). As a result, the input signal of the front unit register of the forward direction (in this case, the unit register Res5) is at ground level and reset via the transistor Tr8-5 (shown in the diagram).

Figure 10:
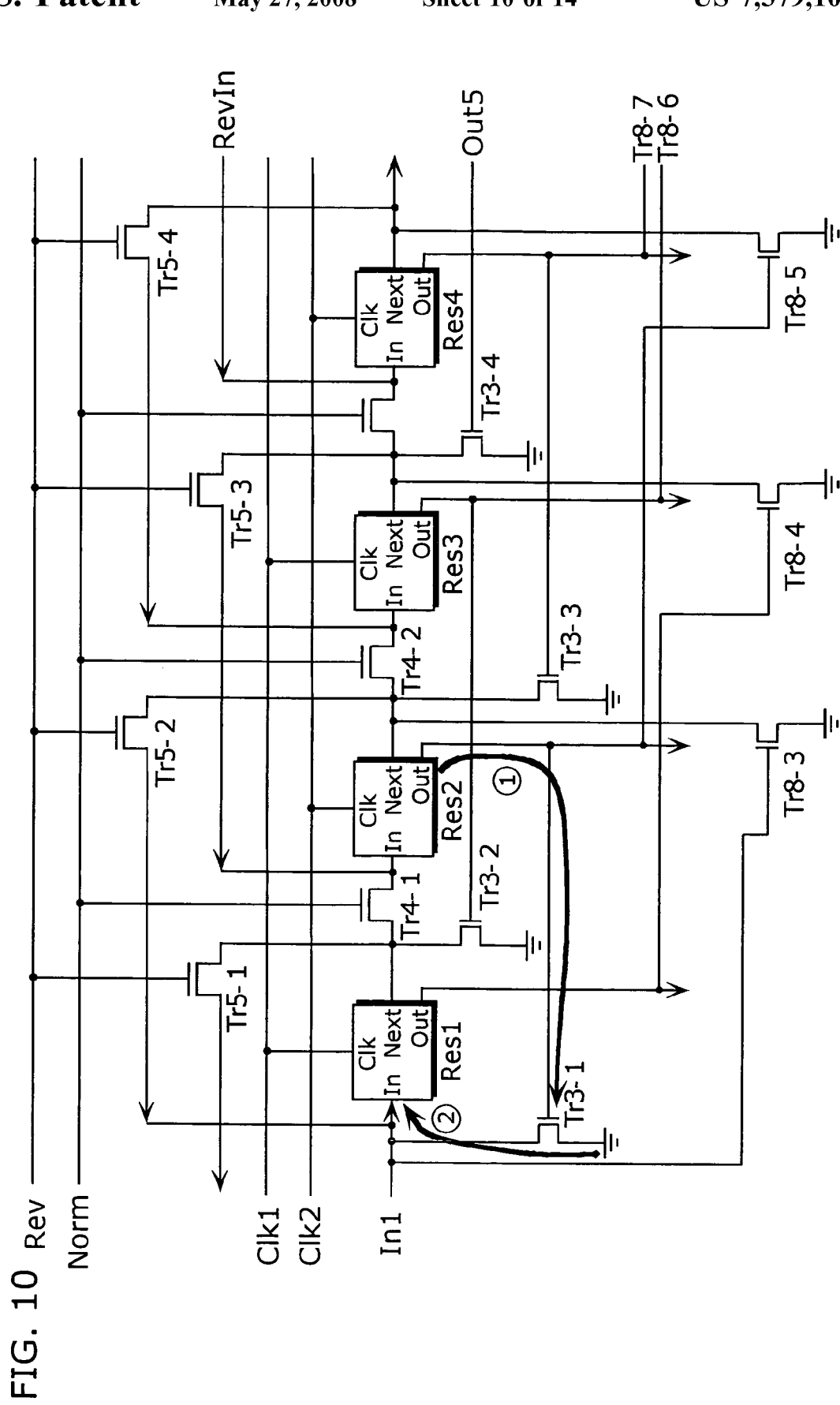
FIG. 10 shows the resetting operation of the input signal of the forward unit register in the case of the forward shifting direction.

(B) Each of the transistors Tr3 resets the input signal In of the unit register (the back unit register of the forward direction) which is placed in back of the unit register where the output signal Out which is connected to the gate is at high level in the forward shifting operation. FIG. 10 shows the resetting operation of the back unit register of the forward direction in the case the output signal of the unit register Res2 is at high level. As in FIG. 10, the transistor Tr3-1 is on when the output signal Out2 of the unit register Res2 is at high level (shown in the diagram). As a result, the input signal of the back unit register of the forward direction (in this case, the unit register Res1) is at ground level and reset via the transistor Tr3 (shown in the diagram).

Figure 11:
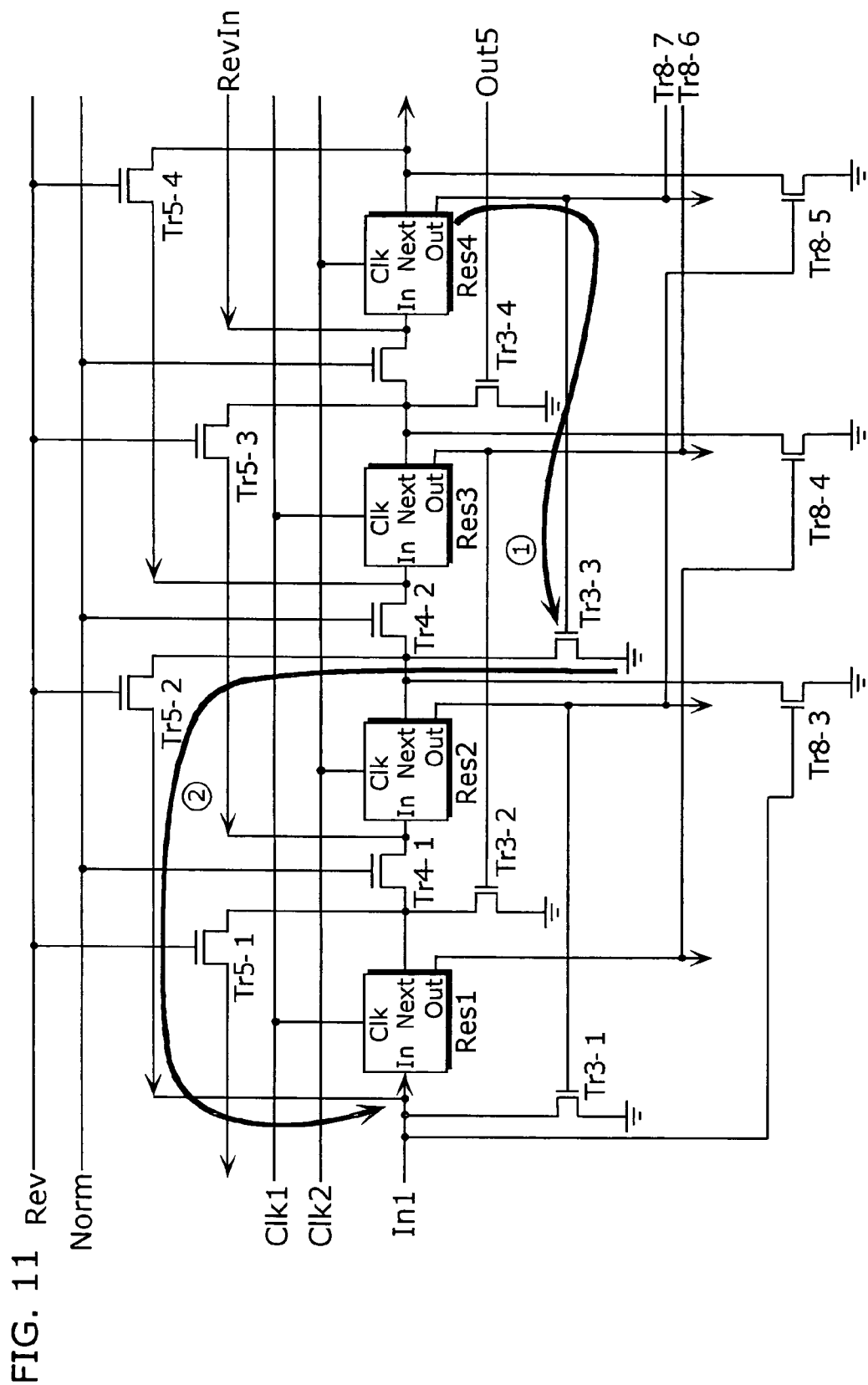
FIG. 11 shows the resetting operation of the input signal of the backward unit register in the case of the forward shifting direction.

(C) Each of the transistors Tr3 resets the input signal In of the unit register (the front unit register of the backward direction) which is placed in front of the unit register where the output signal Out which is connected to the gate is at high level in the backward shifting operation. FIG. 11 shows the resetting operation of front unit register of the backward direction in the case the output signal of the unit register Res4 is at high level. As in FIG. 11, the transistor Tr3-3 is on when the output signal Out4 of the unit register Res4 is at high level (shown in the diagram). As a result, the input signal of the front unit register of the backward direction (in this case, the unit register Res1) is at ground level and reset via the transistors Tr3-3 and Tr5-2 (shown in the diagram).

Figure 12:
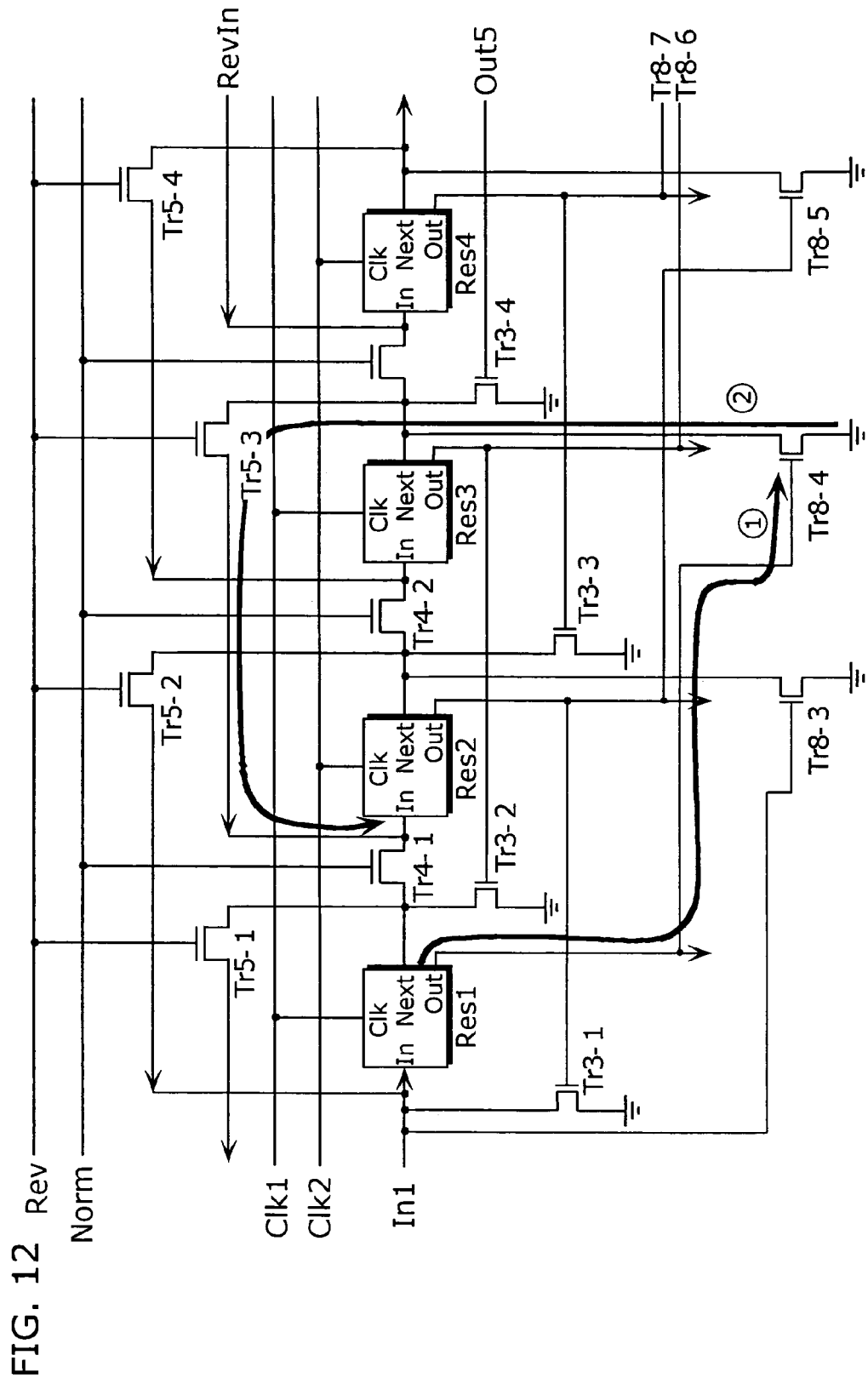
FIG. 12 shows the resetting operation of the input signal of the forward unit register in the case of the backward shifting direction.

(D) Each of the transistors Tr8 resets the input signal In of the unit register (the back unit register of the backward direction) which is placed in back of the unit register where the output signal Out which is connected to the gate is at high level in the backward shifting operation. FIG. 12 shows the resetting operation of the back unit register of the backward direction in the case the output signal of the unit register Res1 is at high level. As in FIG. 12, the transistor Tr8-4 is on when the output signal Out1 of the unit register Res1 is at high level (shown in the diagram). As a result, the input signal of the back unit register of the backward direction (in this case, the unit register Res2) is at ground level and reset via the transistors Tr8-4 and Tr5-3 (shown in the diagram).

In this manner the resetting operations of the (A),(B),(C) and (D) are performed by the transistors Tr8, Tr3, Tr3 and Tr8. In other words, the transistor Tr8 is used as the reset transistor for the both cases of (A) and (D); the transistor Tr3 is used as the reset transistor for the both cases of (B) and (C).

Because the bidirectional shift register of the present embodiment comprised as mentioned above resets the input signal of the front unit register in both the forward shifting operation and the backward shifting operation, it can apply the second start pulse at anytime in the middle of the shifting operation. Thus, this bidirectional shift register enables both the regular scanning where only one unit register outputs the output signal and the special scanning where two unit registers output the output signals in both the forward shifting operation and the backward shifting operation.

The time charts of the regular scanning and the special scanning in the forward shifting operation are the same as the ones in FIGS. 7A and 7B.

Figure 13A:
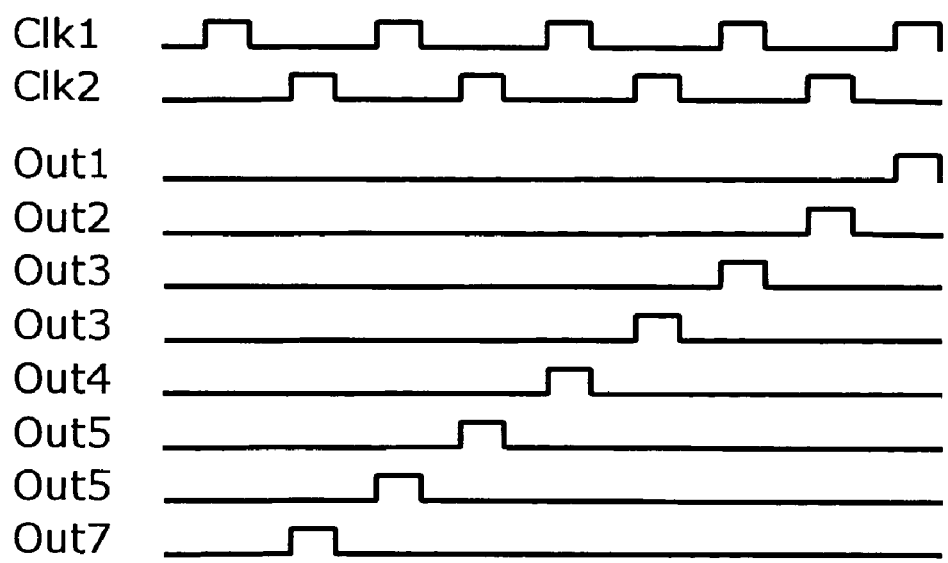
FIG. 13A is a time chart showing the regular scanning in the case of the backward shifting operation.

FIG. 13A is the time chart of the regular scanning in the backward shifting operation. In FIG. 13A only the shifting direction is different from FIG. 7A.

Figure 13B:
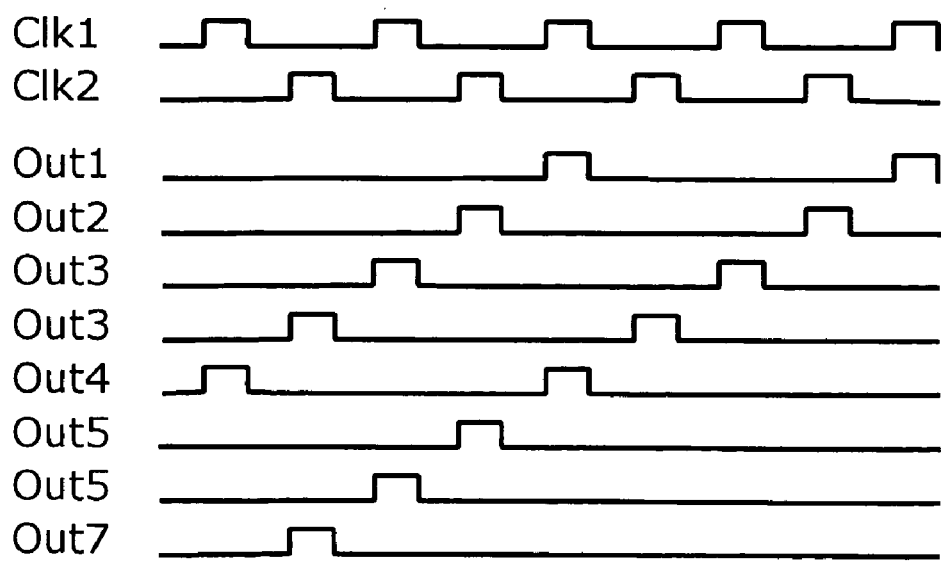
FIG. 13B is a time chart showing the special scanning in the case of the backward shifting operation.

FIG. 13B is the time chart of the special scanning in the backward shifting operation. In FIG. 13B only the shifting direction is different from FIG. 7B.

In FIG. 13B the space between the two pulses which are outputted from the output signal Out can be set randomly according to the input timing of the two start pulses. In the case the present shift register is the shift register 62 as in FIG. 1, it can be utilized for an electronic shutter with the first pulse as the pulse to reset the row of the image sensor and the second pulse to read the pixel value of the current row. Furthermore, since it operates in the backward shifting direction in FIG. 13B, the vertically reversed image can be acquired in the image sensor.

As mentioned above, the image sensor of the present embodiment can apply the second start pulse at anytime in the middle of the shifting operation because it resets the input signal of the front unit register in both the forward shifting operation and the backward shifting operation. In addition, since the transistors Tr3 and Tr8 function as the reset transistors in both the forward shifting operation and the backward shifting operation, a small-scale circuit is made possible.

Although the transistor Tr8 is placed so as to reset the input signal In of the unit register which is three stages forward from each unit register in the shift register shown FIG. 6, it can be placed, for example, ten stages or twenty stages forward as long as it is more than stages forward.

Figure 3:
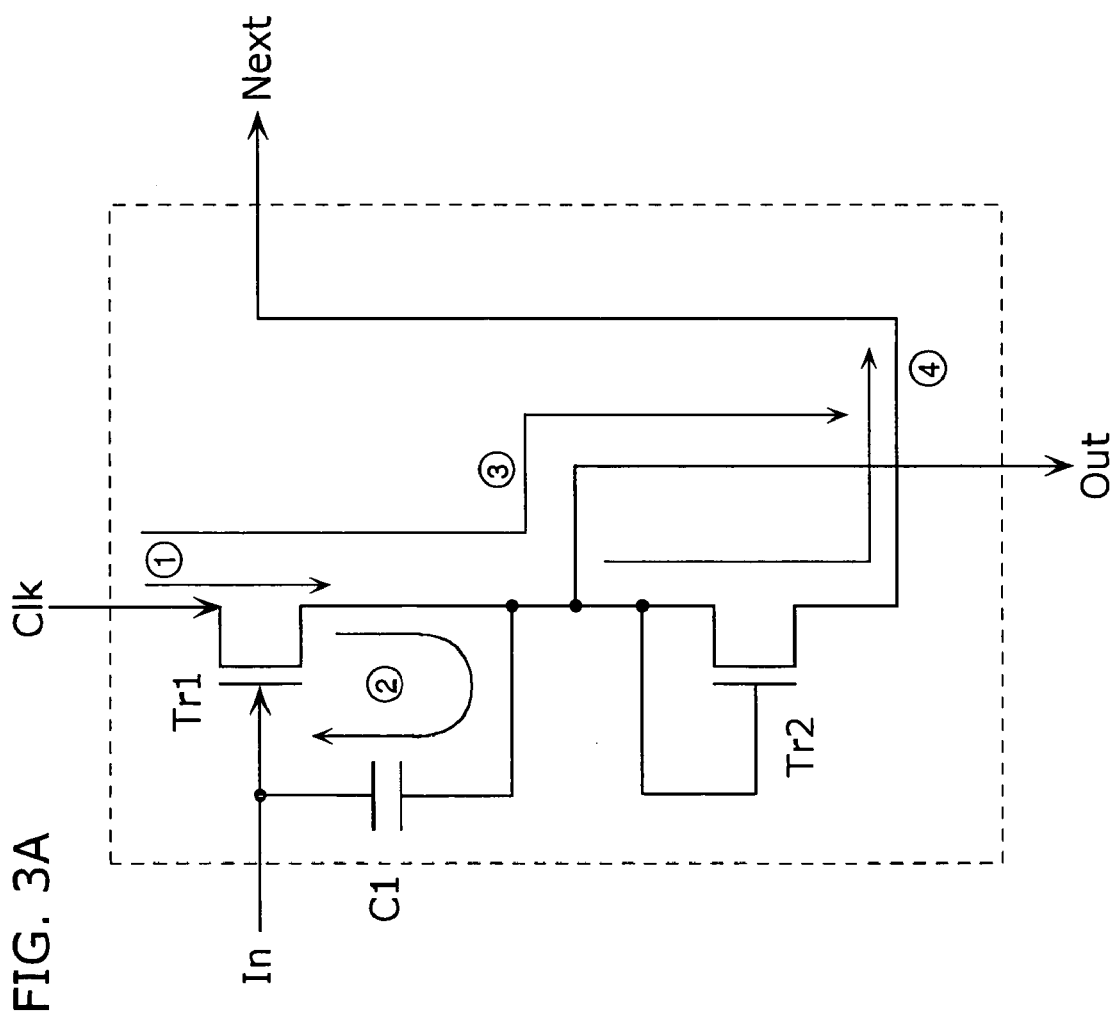
FIG. 3A is a circuit diagram showing the structure of the unit register.
FIG. 3B shows an operation performed by the unit register.
Figure 4:
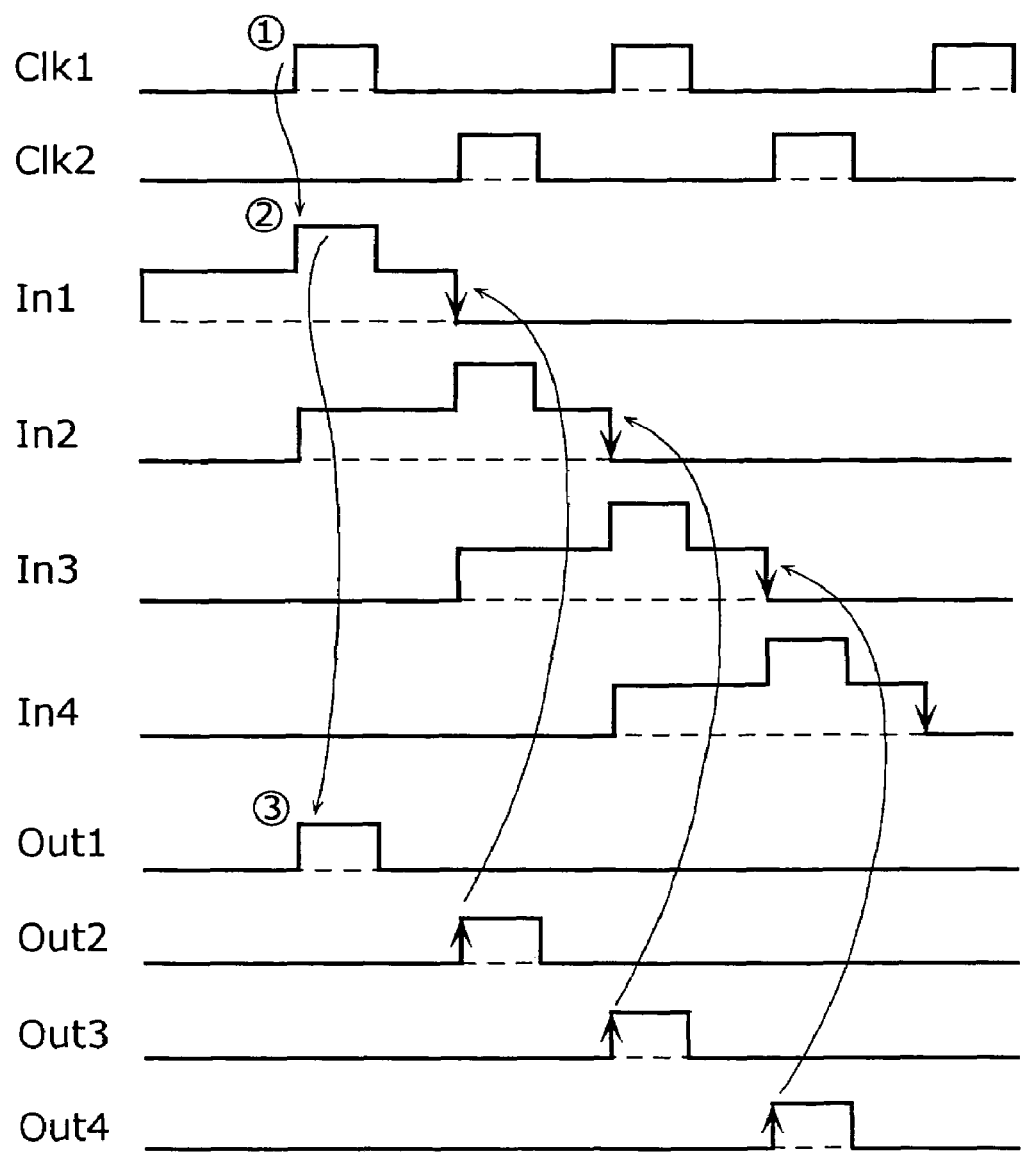
FIG. 4 is a time chart showing the resetting operation carried out by the transistor as shown in FIG. 1.
Figure 5:
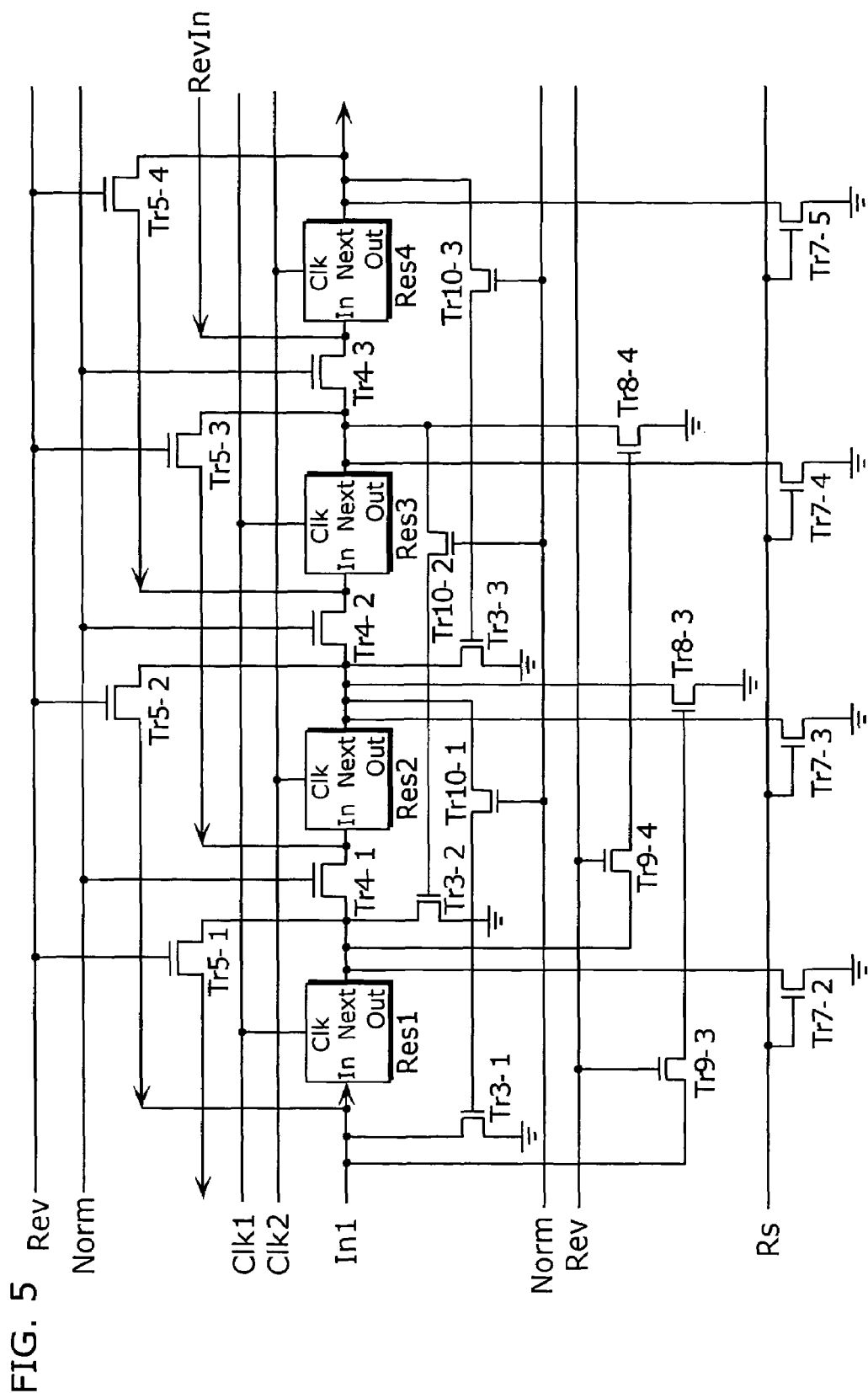
FIG. 5 is a block diagram showing the structure of the conventional bidirectional shift register.

Also, in the shift register in FIGS. 6 and 3, the transistor Tr3-1 can be omitted in the case the input signal In1 is at high level or at low level.

Also, in FIG. 8 the transistor Tr6 can be inserted right before the input signal In of each unit register, and the different clock signal from that of the unit register can be inputted into the gate of the transistor Tr6. Thus, the transistor Tr6 can limit the capacitive load of the input signal In from the viewpoint of the unit register to the capacity of the only one transistor Tr6, and can prevent the boost voltage of the unit register from falling. For example, as the bidirectional shift register as mentioned above, in the case the transistor which inputs the register signal of the front stage into a unit register and the transistor which inputs the register signal of the back stage into a unit register are connected, if the transistors are connected to the input of the unit register via the transistor Tr6, it can prevent the capacitive load from increasing. As a result, it can prevent the boost voltage from falling to low level.

Figure 14:
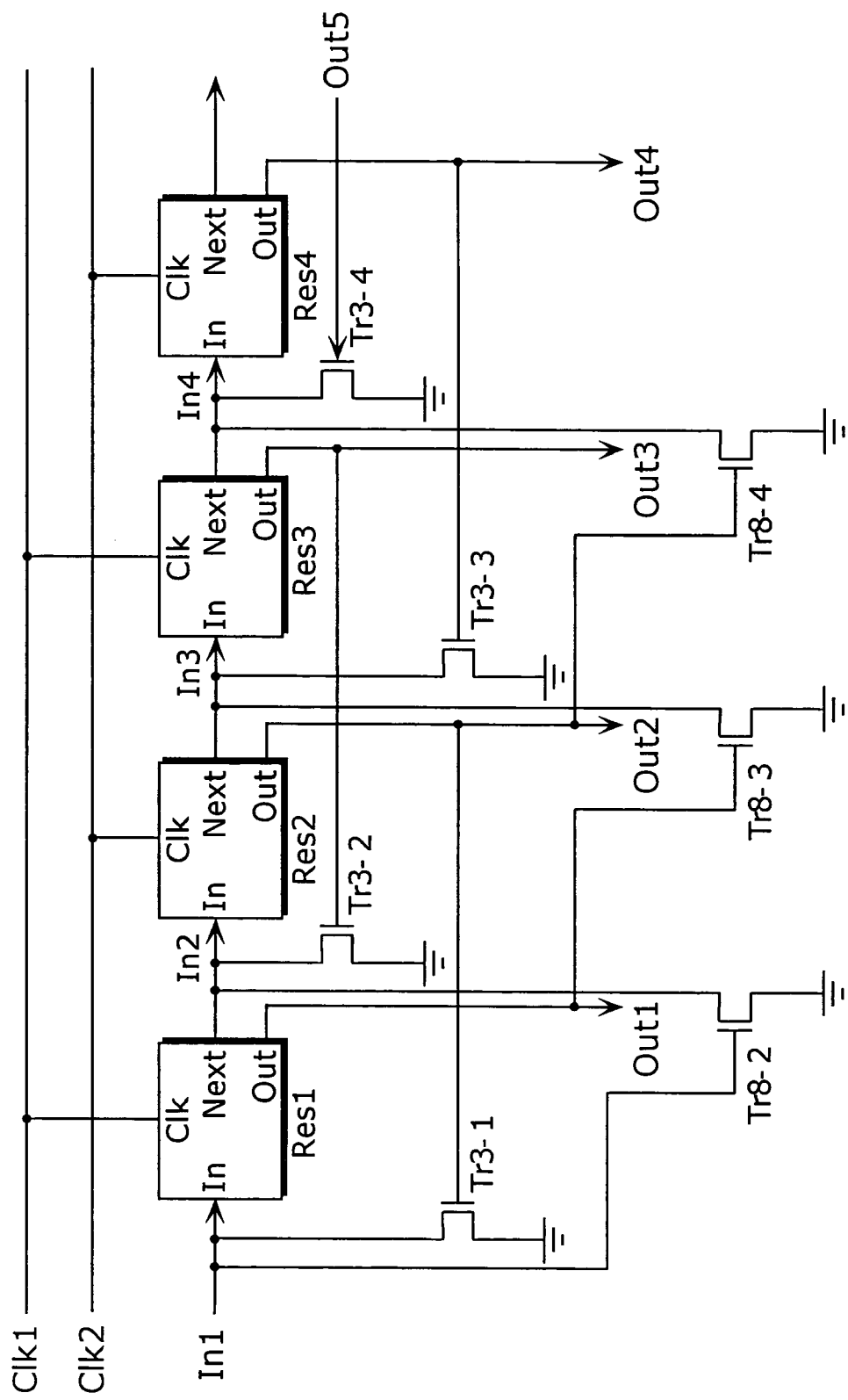
FIG. 14 is a block diagram showing the structure of the shift register according to other embodiments.

FIG. 14 is a block diagram showing the structure of the shift register according to other embodiments. In FIG. 6 the transistor Tr8 resets the input signal of the unit register which is three stages forward from the unit register which has outputted the high level signal; in FIG. 14 the transistor Tr8 resets the input signal of the unit register which is two stages forward from the unit register which has outputted the high level signal.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image sensor comprising;
a shift register, formed by a dynamic logic circuit, for sequentially selecting a row or a column of a two-dimensional imaging unit,
said shift register comprising:
a plurality of stages of unit registers, each holding a signal,
a plurality of first reset circuits corresponding to the unit registers, and each of the first reset circuits being operable to reset an input signal of a back unit register when the unit register corresponding to the first reset circuit outputs a high level signal, said back unit register being arranged in back of the corresponding unit register in a shifting direction, and a plurality of second reset circuits corresponding to the unit registers, and each of the second reset circuits being operable to reset an input signal of a front unit register when the unit register corresponding to the second reset circuit outputs a high level signal, said front unit register being arranged in front of the corresponding unit register in the shifting direction;

wherein each first reset circuit has a first transistor which is on when the output signal of the corresponding unit register is at high level, and drives an input signal line of the back unit register to a low level via the first transistor; and wherein each second reset circuit includes a second transistor which is on when an output signal of the corresponding unit register is at high level, and drives an input signal line of the front unit register to the low level via the second transistor.

2. The image sensor according to claim 1,
wherein the front unit register is one of the unit registers which are arranged at least two stages forward of the unit register corresponding to each second reset circuit in the shifting direction.

3. The image sensor according to claim 1,
wherein the front unit register is any one of the unit resisters which are arranged at least two stages forward from the corresponding unit register in the shifting direction.

4. An image sensor, comprising a bidirectional shift register, formed by a dynamic logic circuit, for sequentially selecting a row or a column of a two-dimensional image sensor,
wherein the bidirectional shift register includes a plurality of stages of unit registers, each holding a signal, a plurality of first reset circuits and a plurality of second reset circuits,
the first reset circuits correspond to the unit registers, and each of the first reset circuits i) resets an input signal of a back-forward unit register when the unit register corresponding to the first reset circuit outputs a high level signal in a forward shifting operation, said back-forward unit register being arranged in back of the corresponding unit register in forward shifting direction, and ii) resets an input signal of a front-backward unit register when the unit register corresponding to the first reset circuit outputs a high level signal in a backward shifting operation, said front-backward unit register being arranged in front of the corresponding unit register in backward shifting direction,
the second reset circuits correspond to the unit registers, and each second reset circuit i) resets an input signal of a front-forward unit register when the unit register corresponding to the second reset circuit outputs a high level signal in a forward shifting operation, said front-forward unit register being arranged in front of the corresponding unit register in forward shifting direction, and ii) resets an input signal of a back-backward unit register when the corresponding unit register outputs a high level signal in a backward shifting operation, said back-backward unit register being arranged in back of the corresponding unit register in backward shifting direction.

5. The image sensor according to claim 4,
wherein the front-forward unit register is any one of the unit registers which are arranged at least two stages forward, from the unit register corresponding to each second reset circuit in shifting direction, and the front-backward unit register is any one of the unit registers which are arranged at least forward, from the unit register corresponding to each first reset circuit in shifting direction.

6. The image sensor according to claim 4,
wherein the bidirectional shift register includes a plurality of forward connecting transistors, each connecting input and output of said plurality of stages of the unit registers in forward direction in a forward shifting operation and a plurality of backward connecting transistors, each connecting input and output of the unit registers in backward direction in a backward shifting operation,
each first reset circuit i) has a first transistor which is on when an output signal of the corresponding unit register is at high level, said first transistor being connected to the ground line, ii) connects, via the forward connecting transistor, the input signal line of a back-forward unit register and the first transistor, and iii) connects, via the backward connecting transistor, the input signal line of the front-backward unit register and the first transistor, and
each second circuit i) has a second transistor which is on when an output signal of the corresponding unit register is at high level, said second transistor being connected to the ground line, ii) connects, via the forward connecting transistor, the input signal line of the front-forward unit register and the second transistor, and iii) connects, via the backward connecting transistor, the input signal line of the back-backward unit register and the second transistor.

7. The image sensor according to claim 6,
wherein the front-forward unit register is one of the unit registers which are arranged at least two stages forward in shifting direction from the unit register corresponding to each second reset circuit, and
the front-backward unit register is one of the unit registers which are arranged at least more than two stages forward in shifting direction from the unit register corresponding to the first reset circuit.

8. A driving method for an image sensor, the image sensor comprising a shift register, formed by a dynamic logic circuit, for sequentially selecting a row or a column of a two-dimensional image sensor, the shift register including a plurality of stages of unit registers, said driving method comprising:
a shifting step of shifting the shift register by one stage;
a first reset step of resetting an input signal of a back unit register, the back unit register being arranged in back of a unit register which outputs a high level signal by shifting one stage in a shifting direction;
a second reset step of resetting an input signal of a front unit register, the front unit register being arranged in front of a unit register which outputs a high level signal by shifting one stage in the shifting direction;
turning on a first transistor in each first reset circuit when the output signal of the corresponding unit register is at high level, and driving an input signal line of the back unit register to a low level via the first transistor; and
turning on a second transistor in each second reset circuit when an output signal of the corresponding unit register is at high level, and driving an input signal line of the front unit register to the low level via the second transistor.

9. A driving method for an image sensor, the image sensor comprising a shift register, formed by a dynamic logic circuit, for sequentially selecting a row or a column of a two-dimensional image sensor; the shift register including a plurality of stages of unit registers, a plurality of forward connecting transistors which connect the input and output of the plurality of unit registers in a forward shifting operation, and a plurality of backward connecting transistors which connect the input and output of the plurality of unit registers in a backward shifting operation, and the method comprising:

a setting step of setting, each forward connecting transistor as on and each backward connecting transistor as off, in a forward shifting operational mode;

a shifting step of shifting the shift register by one stage, and a first reset step of resetting an input signal of a back unit register, said back unit register being arranged in back, in shifting direction, of the unit register which has outputted a high level signal by shifting one stage; and a second reset step of resetting an input signal of a front unit register, said front unit register being arranged in front, in shifting direction, of the unit register which outputs a high level signal by shifting one stage.

10. A camera comprising an image sensor, the image sensor comprising:

a shift register, formed by a dynamic logic circuit, for sequentially selecting a row or a column of a two-dimensional imaging unit, said shift register comprising:

a plurality of stages of unit registers, each holding a signal, a plurality of first reset circuits corresponding to the unit registers, and each of the first reset circuits being operable to reset an input signal of a back unit register when the unit register corresponding to the first reset circuit outputs a high level signal, said back unit register being arranged in back of the corresponding unit register in a shifting direction, and a plurality of second reset circuits corresponding to the unit registers, and each of the second reset circuits being operable to reset an input signal of a front unit register when the unit register corresponding to the second reset circuit outputs a high level signal, said front unit register being arranged in front of the corresponding unit register in the shifting direction;

wherein each first reset circuit has a first transistor which is on when the output signal of the corresponding unit register is at high level, and drives an input signal line of the back unit register to a low level via the first transistor; and wherein each second reset circuit includes a second transistor which is on when an output signal of the corresponding unit register is at high level, and drives an input signal line of the front unit register to the low level via the second transistor.

* * * * *